United States Patent [19]
Rogers

[11] Patent Number: 5,353,666
[45] Date of Patent: Oct. 11, 1994

[54] OIL FILTER WRENCH

[76] Inventor: James F. Rogers, P.O. Box 723, Dallas, Tex. 75221-0723

[21] Appl. No.: 23,890

[22] Filed: Feb. 26, 1993

[51] Int. Cl.$^5$ ............................................. B25B 13/00
[52] U.S. Cl. ...................................... 81/124.4; 81/3.4; 81/125.1
[58] Field of Search ................... 81/3.4, 121.1, 124.2, 81/124.4, 124.6, 125.1

[56] References Cited

U.S. PATENT DOCUMENTS

| | | |
|---|---|---|
| 842,039 | 1/1907 | Walt ............................. 81/124.4 X |
| 2,746,330 | 5/1955 | Pfetzing . |
| 3,385,141 | 5/1968 | Norman . |
| 4,266,452 | 5/1981 | Crist . |
| 4,840,094 | 6/1989 | Macor . |
| 4,865,727 | 9/1989 | Krauss . |
| 4,867,017 | 9/1989 | Holman . |
| 4,982,629 | 1/1991 | Germain . |
| 5,048,379 | 9/1991 | Gramera et al. .................... 81/124.4 |
| 5,148,724 | 9/1992 | Rexford ......................... 81/124.4 X |

Primary Examiner—James G. Smith
Attorney, Agent, or Firm—Charles D. Gunter, Jr.

[57] ABSTRACT

An improved filter wrench is shown for applying torque to a canister-type oil filter to engage and disengage the threaded end thereof from an engine block. The tool includes a wrench body having a larger and smaller aperture for reversibly receiving smaller and larger relatively sized filter canisters. A separate driver adapter engages the exterior of the wrench body when a filter canister is being received within the larger aperture and is itself received within the larger aperture when a filter canister is being received within the smaller aperture of the wrench body.

7 Claims, 4 Drawing Sheets

OIL FILTER WRENCH

BACKGROUND OF THE INVENTION

1. Field of the Invention

The present invention relates to utility tools of the wrench type and, more specifically, to such tools designed for the removal of canister-shaped objects such as canister-type oil filters from engines.

2. Description of the Prior Art

Most canister-type oil filters designed for internal combustion engines have a standardized external profile. These canisters include an engagement end having a threaded portion for engagement with mating threads provided upon the engine and have a cylindrical outer configuration which extends from the threaded engagement end for a major portion of the filter's length. The remaining portion of the canister-type filter is of a polygonal cross-section.

Conventional canister-type oil filters of the above type are normally located on the bottom region of the internal combustion engine being filtered. As a result, there is restricted access to the filter. Although the torque required to remove such oil filter canisters is not unduly large, it usually is greater than that which can be applied manually. Some form of wrench is generally required in order to achieve the required torque. Removing the filter can be a difficult job because of the location of the filter and because of the crowded environment found in the engine compartment of many modern internal combustion engines.

It is an object of the present invention to provide an improved wrench which is of simple, inexpensive construction and which is well adapted for disconnecting a canister-shaped object from its associated support in extremely tight and confined locations.

Another object of the invention is to provide a novel and improved special purpose wrench for applying torque to an oil filter canister which is threadedly engaged on an engine block of an internal combustion engine.

Another object of the invention is to provide an improved oil filter wrench adapted for use with an associated driver adapter for applying torque to a canister-type oil filter which wrench can accommodate a variety of sizes of canister-type filters.

SUMMARY OF THE INVENTION

The improved oil filter wrench of the invention includes a wrench body having a stepped exterior surface, a stepped interior surface and an initially open interior which defines a larger aperture at one extent thereof and a relatively smaller aperture at an opposite extent thereof. The larger and smaller apertures are sized to accommodate different sized oil filters of the canister type. A separate driver adapter is provided having a complimentary profile for engaging either of the opposite extents of the wrench body for applying torque thereto when an oil filter is engaged within a selected aperture of the wrench body.

The separate driver adapter can be constructed having an external sidewall and an internal sidewall, both of which terminate in a drive flange adapted to matingly engage a drive tool for imparting rotational energy to the wrench body. Preferably, the driver adapter is selectively sized to be matingly engaged within the larger aperture of the wrench body to accommodate a first range of oil filter sizes for applying torque thereto, and to be matingly engaged about the exterior surface of the wrench body adjacent the smaller aperture to accommodate a second range of sizes of oil filters for applying torque thereto.

Preferably, the exterior surface of the wrench body comprises a generally cylindrical first step portion which is joined by a shoulder region to a generally cylindrical second step portion. The external sidewall of the driver adapter is also preferably of generally cylindrical configuration. The wrench body external and internal surfaces and the driver adapter external and internal sidewalls define mating contact regions when the driver adapter and the wrench body are engaged. Preferably, at least selected mating contact regions of the wrench body and driver adapter are provided with non-slip profiles.

The improved oil filter wrench of the invention can be used to remove screw-on type canister oil filters of varying sizes. In use, a first size oil filter is engaged within, for example, the smaller aperture of the wrench body. The driver adapter is engaged within the larger aperture of the wrench body. A drive tool is then connected to the driver adapter. The drive tool is then rotated which, in turn, rotates the oil filter to be unthreaded.

A second size oil filter can be engaged within the larger aperture of the wrench body. In such case, the driver adapter is engaged about the exterior of the wrench body adjacent the smaller aperture thereof. A driver tool is then connected to the driver adapter allowing the driver adapter to be rotated and, in turn, to rotate the oil filter to be unthreaded.

Additional objects, features and advantages will be apparent in the written description which follows.

BRIEF DESCRIPTION OF THE DRAWINGS

in FIG. 3;

in FIG. 3;

in FIG. 3;

in FIG. 3;

in FIG. 3;

DETAILED DESCRIPTION OF THE INVENTION

Figure 1:
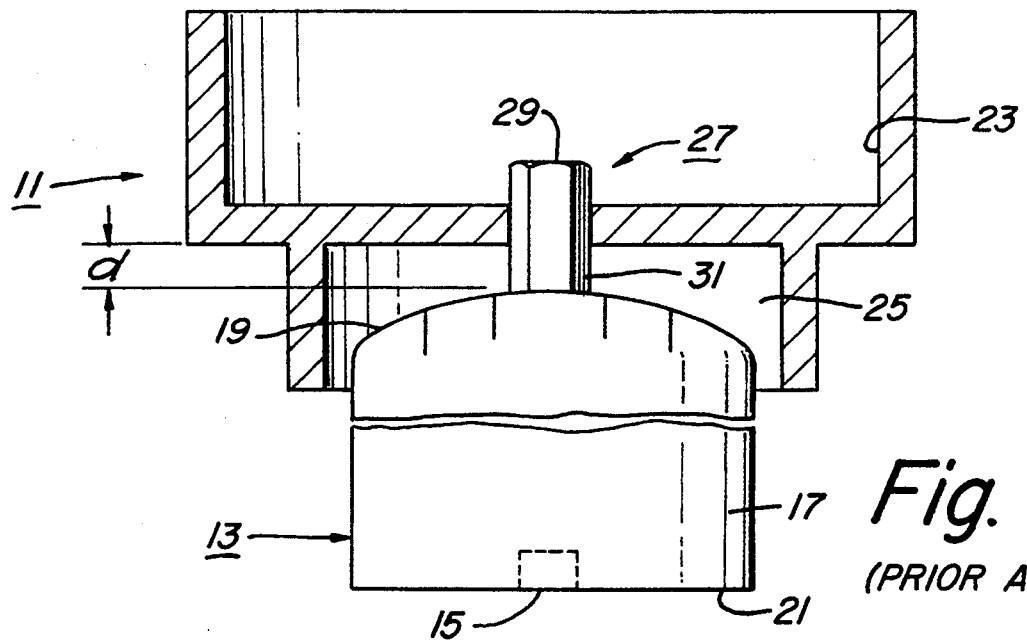
FIG. 1 is a side, cross-sectional view of a prior art oil filter wrench showing the wrench engaging a canister-type oil filter.

FIG. 1 shows a prior art oil filter wrench, designated generally as 11, engaging an oil filter 13 of the canister type (shown partly broken away). The oil filter canister 13 is of the conventional type for use with internal combustion engines and has one end with a threaded extent 15 for engaging the mating threads (not shown) provided on a nipple extending from the engine block. The filter canister 13 has a generally cylindrical outer extent 17 which extends from the lower end 21 to a second portion 19 which is polygonal in cross-section, having a plurality of flat sides or flutes. In most standard configurations, the cylindrical portion 17 comprises about ¾ of the canister length with the polygonal portion 19 comprising slightly less than ¼ of the length. The lower end 21 of the canister is essentially flat.

The prior art filter wrench 11, shown in FIG. 1, included a first compartment 23 for receiving a first sized filter canister and a second compartment 25 for receiving a relatively smaller outer diameter filter canister. A lug 27 was positioned within the interior of the filter wrench 11 so that a first extent 29 was engageable by a socket wrench positioned within the first compartment and a second extent 31 was engageable by a socket wrench positioned within the second compartment 25. The prior art wrench could thus be reversed in operation to accommodate filter canisters of varying external diameter.

While the prior art design illustrated in FIG. 1 was an improvement at the time, it consumed more space than is available in many of the more crowded, modern engine compartments. Because of the central lug arrangement, a certain amount of space (illustrated as $d_1$ in FIG. 1) was lost. The loss of even ¼ to ½ inch of space in the axial direction can be critical in the extreme confinement of many modern engine compartments.

Figure 2:
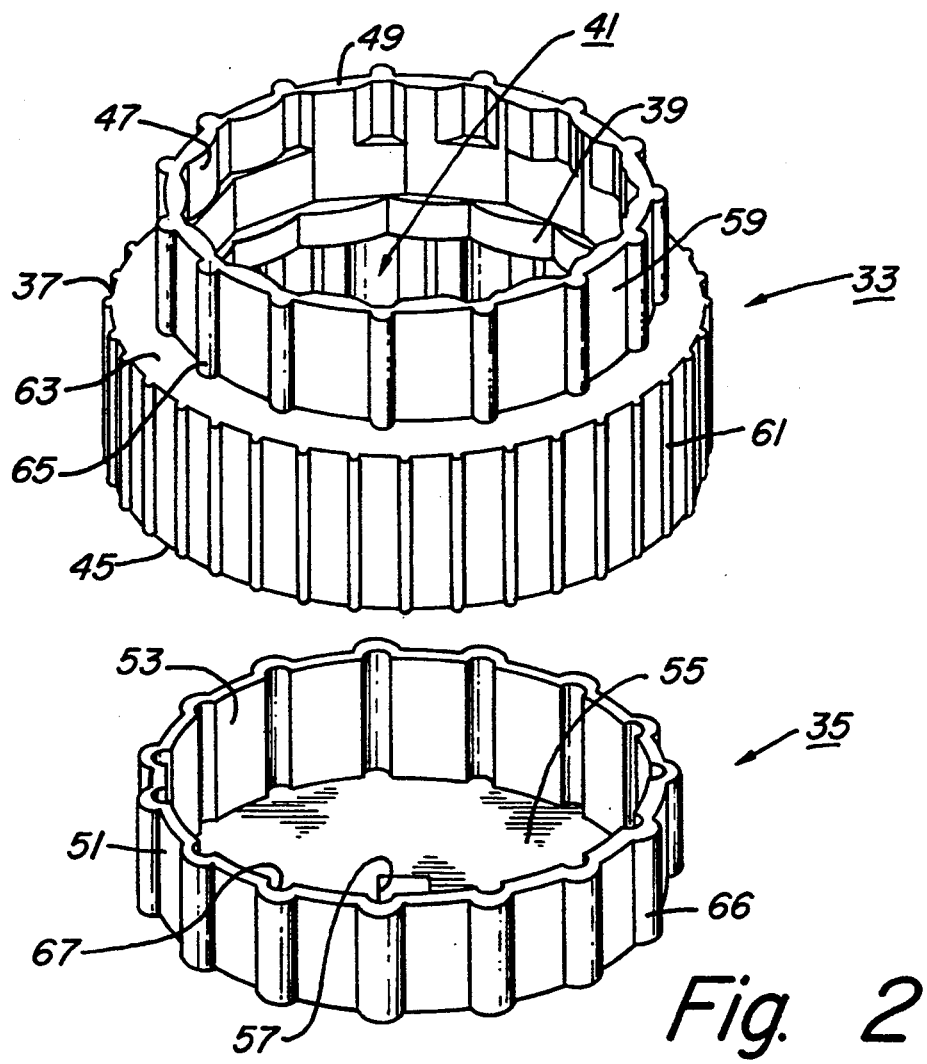
FIG. 2 is a perspective, exploded view of the wrench body and driver adapter of the improved oil filter wrench of the invention.

FIG. 2 shows the improved oil filter wrench of the invention in exploded fashion. The improved oil filter wrench of the invention includes a wrench body 33 and a separate driver adapter 35. The wrench body has a stepped exterior surface 37, a stepped interior surface 39 and an initially open interior 41 which defines a larger aperture (43 in FIG. 3) at one extent 45 thereof for accommodating a first range of sizes of oil filters and a relatively smaller aperture 47 at an opposite extent 49 thereof, the smaller aperture being sized to accommodate a second, different range of sizes of oil filters. Thus, each end of the wrench body can be formed to accommodate different sizes and/or shapes of oil filter canisters. For example, some common commercially available oil filter canister sizes are 93 mm, 80 mm, 76 mm and 74.5 mm. Some of these filters have 14 flutes, 15 flutes, 36 flutes and some of the flutes have different shapes.

As shown in FIG. 2, the separate driver adapter 35 has a generally cylindrical external sidewall 51 and an internal sidewall 53, both of which are connected by a perpendicular end wall 55 to a drive flange 57. The drive flange 57 is adapted to matingly engage a drive tool, such as a socket wrench, for imparting rotational energy to the wrench body. It is possible, however, that other drivers could be utilized such as a box-end wrench, an open end wrench, or even a user's hand could be used to apply torque to the wrench body. In the preferred embodiment of FIG. 2, the driver adapter is selectively sized to be matingly engaged within the larger aperture (43 in FIG. 3) of the wrench body 33 to accommodate a first range of sizes of oil filter canisters and to be matingly engaged about the exterior surface (59 in FIGS. 2 and 3) of the wrench body 33 adjacent the smaller aperture 47 to accommodate a second, different range of sizes of oil filters.

Although the driver adapter 35 illustrated in FIG. 2 can be used advantageously with the wrench body 33, it will be understood that the driver adapter could assume different configurations, as well. For example, the wrench body 33 could be formed of metal having slots or notches formed in the cylindrical sidewall portions 59, 61 for receiving a mating driver adapter formed in the shape of a rod, bar or cross. It is only necessary that the driver adapter have a complimentary profile for engaging either of the opposite extents of the wrench body 33 for applying torque thereto.

As best seen in FIG. 2, the exterior surface of the wrench body 33 preferably comprises a generally cylindrical first step portion 61 joined at a shoulder 63 to a generally cylindrical second step portion 59. The external sidewall 51 of the driver adapter 35 is also preferably generally cylindrical. The wrench body external and internal surfaces and the driver adapter external and internal sidewalls define mating contact regions when the driver adapter and wrench body are engaged. Preferably, at least selected mating surface regions of the wrench body and driver adapter are provided with non-slip profiles. In the embodiment shown in FIG. 2, the non-slip profile includes a plurality of ribs 65 on the wrench body second step portion 59 and mating grooves 67 provided in the driver adapter internal sidewalls 53. Similarly, the driver adapter 35 has external ribs 66 which can be received within mating grooves (68 in FIG. 3) of the wrench body.

Figure 3:
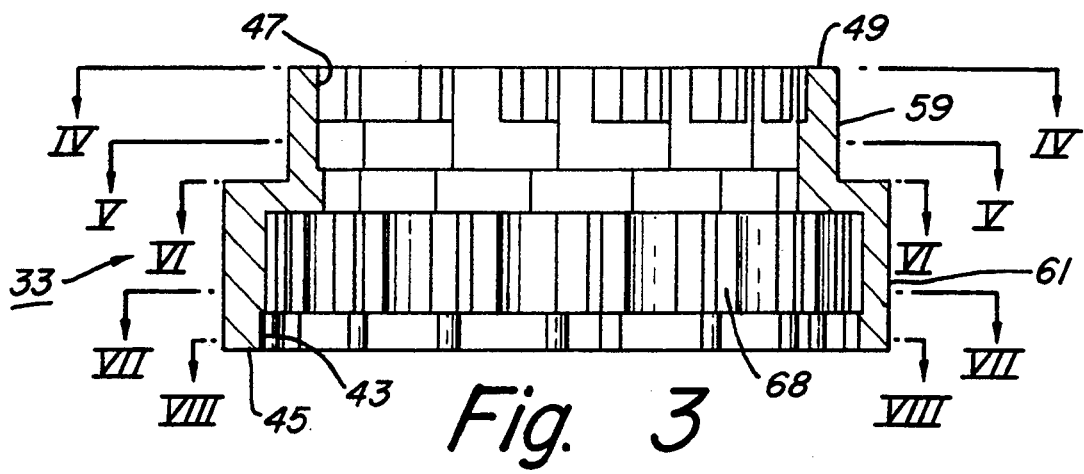
FIG. 3 is a side, cross-sectional view of the wrench body of the improved oil filter wrench of FIG. 2.
Figure 4:
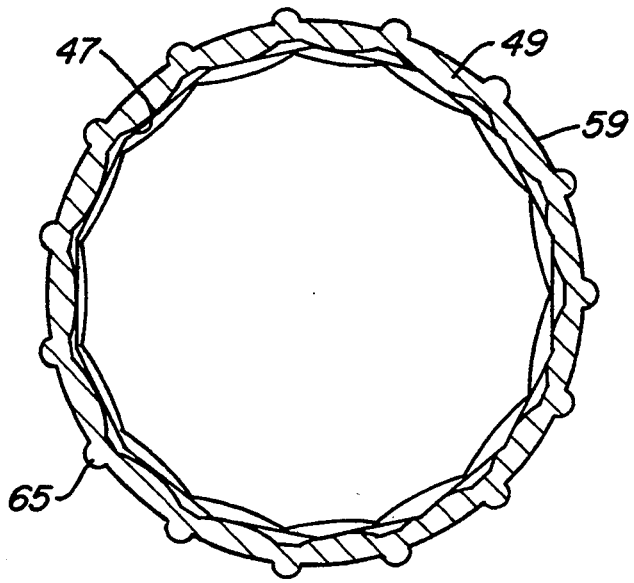
FIG. 4 is a cross-sectional view taken along lines IV.—IV.
Figure 5:
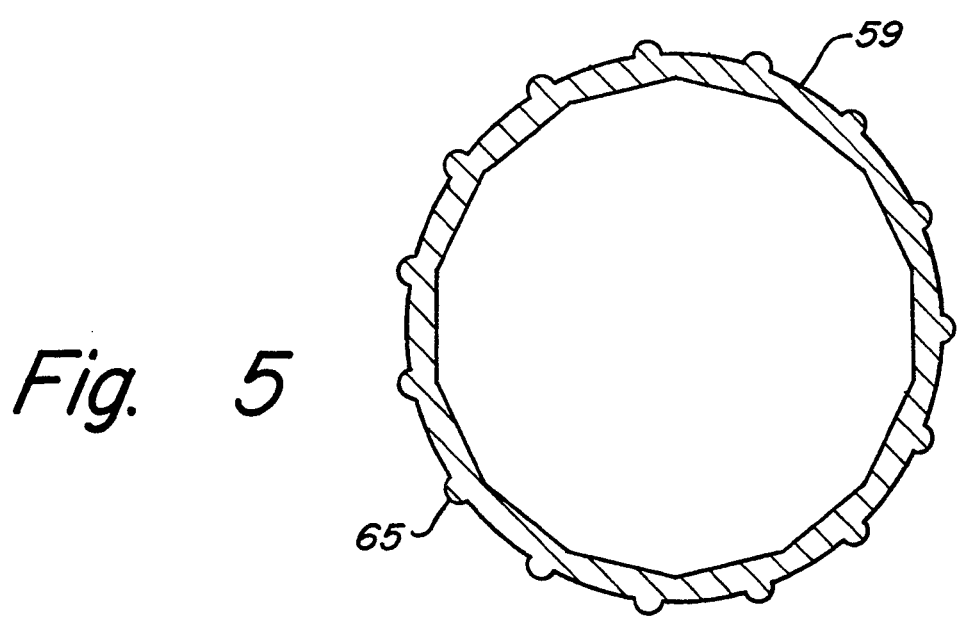
FIG. 5 is a cross-sectional view taken along lines V.-V.
Figure 6:
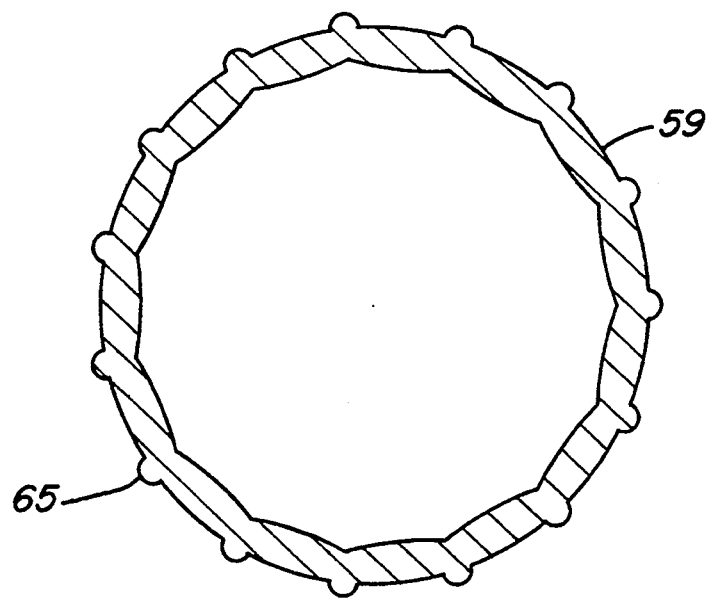
FIG. 6 is a cross-sectional view taken along lines VI.—VI.
Figure 7:
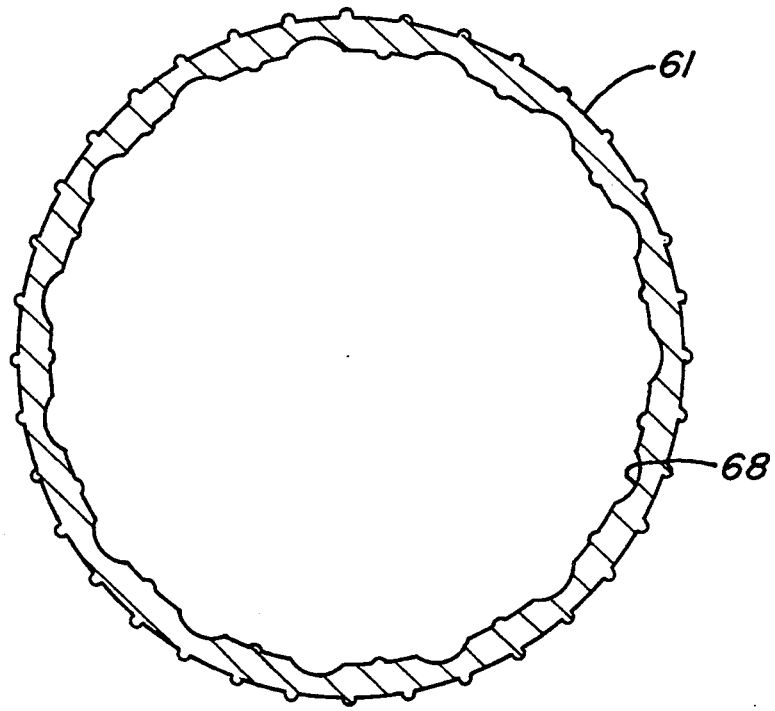
FIG. 7 is a cross-sectional view taken along lines VII.—VII.
Figure 8:
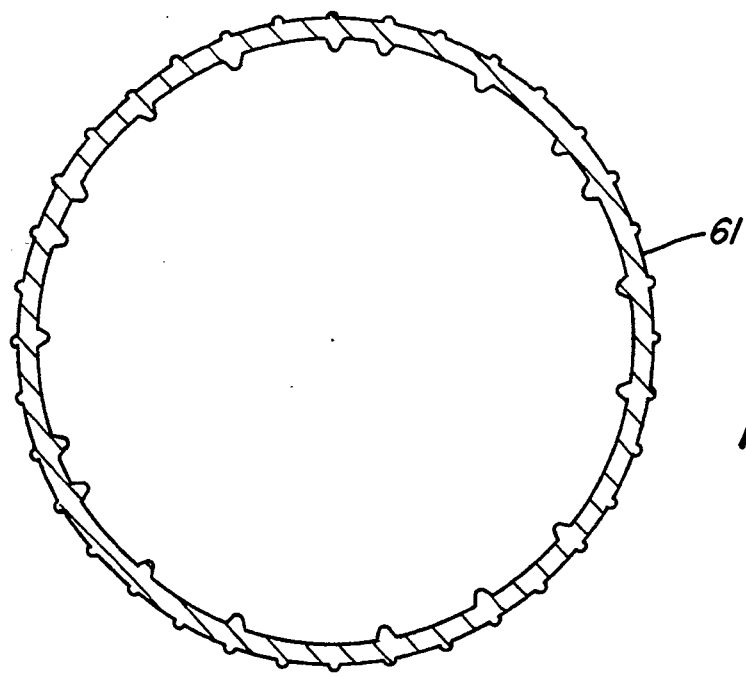
FIG. 8 is a cross-sectional view taken along lines VIII.—VIII.
Figure 9:
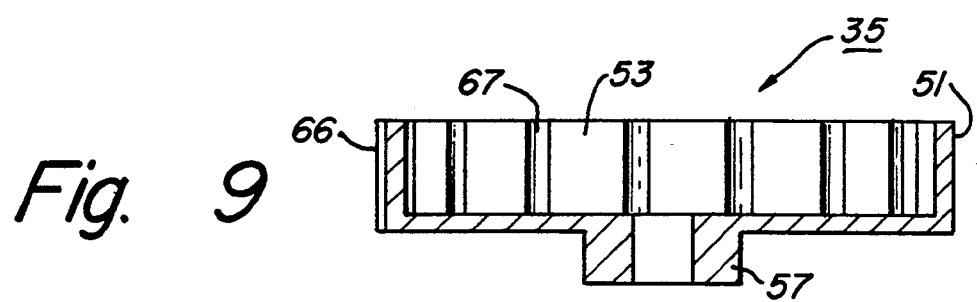
FIG. 9 is a side, cross-sectional view of the driver adapter of the improved oil filter wrench of FIG. 2.
Figure 10:
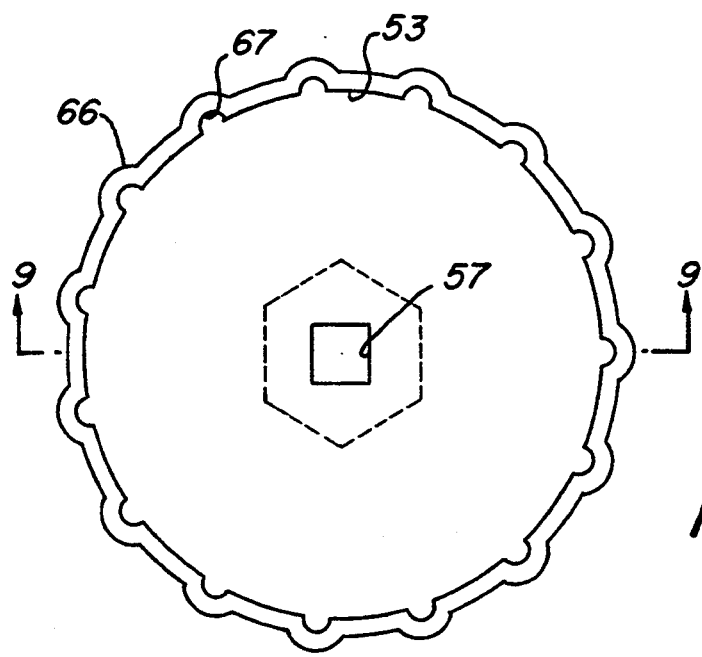
FIG. 10 is a top view of the driver adapter of FIG. 9.

As shown in FIG. 3 and cross-sectional views 4–8, the wrench body interior surfaces are tapered within both the smaller aperture 47 and larger aperture 43 to accommodate variations in oil filter canister sizes. For example, cross-sectional region IV.—IV. is sized to fit FRAM and LEE filters. Cross-sectional region V.—V. is sized to fit an AC filter. Cross-sectional region VII.—VII. is sized to fit FRAM, AC, LEE or PUROLATOR filters, etc.

In operation, a first size oil filter of the canister-type is engaged within, for example, the smaller aperture 47 of the wrench body 33. A driver adapter 35 is engaged within the larger aperture 43 of the wrench body so that the external ribs 66 on the driver adapter engage the mating grooves 68 provided within the generally cylindrical internal sidewall of the first portion 61 of the wrench body 33. A drive tool (not shown) is then connected to the drive flange 57 and the driver adapter 35 is rotated to thereby rotate the wrench body 33 and, in turn, rotate the oil filter to be unscrewed.

A second size oil filter which differs significantly in either external diameter or shape can be engaged within the larger aperture 43 of the wrench body 33. The internal sidewall 53 of the driver adapter 35 is then engaged about the exterior surface 59 of the wrench body 33 adjacent the smaller aperture 47 thereof. A drive tool is connected to the driver adapter 35, as at the drive flange 57, and the driver adapter is rotated to, in turn, rotate the oil filter canister to be unscrewed.

An invention has been provided with several advantages. The oil filter wrench of the invention is simple in design and economical to manufacture. The wrench can be provided, for example, of synthetic, lightweight material such as plastics. The wrench body stepped exterior and interior surfaces allow a variety of oil canisters of varying external dimensions to be accommodated. The separate, driver adapter conserves space within the engine compartment and the wrench body can be easily reversed for rotating larger and relatively smaller sized oil filter canisters.

While the invention has been shown in only one of its forms, it is not thus limited but is susceptible to various changes and modifications without departing from the spirit thereof.

What is claimed is:

1. An improved oil filter wrench, comprising:
   a wrench body having a stepped exterior surface, a stepped interior surface and an initially open interior which defines a larger aperture at one extent thereof and a relatively small aperture at an opposite extent thereof, the larger and smaller apertures being sized to accommodate different sized oil filters; and
   a driver adapter having an external sidewall and an internal sidewall, both of which terminate in a drive flange adapted to matingly engage a drive tool for imparting rotational energy to the wrench body, the driver adapter being selectively sized to be matingly engaged within the larger aperture of the wrench body to accommodate one size oil filter and to be matingly engaged about the exterior surface of the wrench body adjacent the smaller aperture to accommodate a second size oil filter.

2. The improved oil filter wrench of claim 1, wherein the exterior surface of the wrench body comprises a generally cylindrical first step portion joined by a shoulder region to a generally cylindrical second step portion and wherein the external sidewall of the driver adapter is also generally cylindrical.

3. The improved oil filter wrench of claim 2, wherein the wrench body external and internal surfaces and the driver adapter external and internal sidewalls define mating contact regions when the driver adapter and wrench body are engaged, and wherein at least selected mating surfaces of the wrench body and driver adapter are provided with non-slip profiles.

4. The improved oil filter wrench of claim 3, wherein the selected mating surfaces of the wrench body and driver adapter are provided with mating ribs and grooves, respectively.

5. The improved oil filter wrench of claim 3, wherein the wrench body internal surfaces are tapered to engage oil filters of varying diameters.

6. An improved oil filter wrench, comprising:
   a wrench body having a stepped exterior surface, a stepped interior surface and an initially open interior which defines a larger aperture at one extent thereof and a relatively smaller aperture at an opposite extent thereof, the larger and smaller apertures being sized to accommodate different sized oil filters, wherein the exterior surface of the wrench body comprises a generally cylindrical first step portion joined by a shoulder region to a generally cylindrical second step portion; and
   a driver adapter having a generally cylindrical portion with an external sidewall and an internal sidewall, the generally cylindrical portion being connected by an end wall to a drive flange, the generally cylindrical portion of the driver adapter being selectively sized to be matingly engaged within the larger aperture of the wrench body to accommodate one size oil filter and to be matingly engaged about the exterior surface of the wrench body adjacent the smaller aperture to accommodate a second size oil filter.

7. The improved oil filter wrench of claim 6, wherein the drive flange includes a socket fitting for connecting the drive flange to a socket wrench.

* * * * *